(12) United States Patent
Maker (10) Patent No.: US 12,285,676 B2
(45) Date of Patent: *Apr. 29, 2025

(54) DYNAMICALLY CHANGING BUTTON INDICIA FOR A GAME CONTROLLER

(71) Applicant: Backbone Labs, Inc., Vancouver, WA (US)

(72) Inventor: Ozhan Maker, San Diego, CA (US)

(73) Assignee: Backbone Labs, Inc., Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,411

(22) Filed: Jun. 5, 2024

(65) Prior Publication Data

US 2025/0025773 A1    Jan. 23, 2025

Related U.S. Application Data

(63) Continuation of application No. 18/086,103, filed on Dec. 21, 2022, now Pat. No. 12,070,678.

(51) Int. Cl.
*A63F 13/24*    (2014.01)
*A63F 13/92*    (2014.01)

(52) U.S. Cl.
CPC .............. *A63F 13/24* (2014.09); *A63F 13/92* (2014.09)

(58) Field of Classification Search
None
See application file for complete search history.

(56) References Cited

U.S. PATENT DOCUMENTS

| | | |
|---|---|---|
| 4,636,593 A | 1/1987 | Novak |
| 6,238,289 B1 | 5/2001 | Sobota |
| 6,640,268 B1 | 10/2003 | Kumar |
| 6,684,062 B1 | 1/2004 | Gosior |
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |
| 8,760,394 B2 | 6/2014 | Chiang |
| 8,822,851 B2 | 9/2014 | Walker |
| 9,053,243 B2 | 6/2015 | Townsend |
| 9,677,740 B2 | 6/2017 | Steiner |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Milap Shah
(74) *Attorney, Agent, or Firm* — Crowell & Moring LLP (57) ABSTRACT

A gaming device that includes a handheld controller having a handle and a depressible button on the handle configured to receive user input. The depressible button includes a first marking layer including a first indicia, a first light source configured to illuminate the first indicia in the first marking layer, a second marking layer stacked with the first marking layer and including a second indicia, and a second light source configured to illuminate the second indicia in the second marking layer.

20 Claims, 6 Drawing Sheets

(56) References Cited

U.S. PATENT DOCUMENTS

| | | |
|---|---|---|
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,391,393 B2 | 8/2019 | Townley |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,868,436 B1 | 12/2020 | Chen |
| 11,000,759 B2 | 5/2021 | Palmer et al. |
| 11,027,191 B2 | 6/2021 | Oh |
| 11,090,557 B2 | 8/2021 | Downs et al. |
| 11,105,969 B2 | 8/2021 | Sasagawa |
| 11,167,209 B2 | 11/2021 | Lu |
| 11,389,721 B2 | 7/2022 | Khaira et al. |
| 11,395,961 B2 | 7/2022 | Chung |
| 11,528,987 B1 | 12/2022 | Girault |
| 11,662,855 B1 | 5/2023 | Sorensen et al. |
| 11,707,670 B2 | 7/2023 | Khaira et al. |
| 11,819,756 B2 | 11/2023 | Lu |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,070,678 B2 | 8/2024 | Maker |
| 12,074,946 B2 | 8/2024 | Wei et al. |
| 12,115,443 B2 | 10/2024 | Khaira et al. |
| 12,121,800 B2 | 10/2024 | Maker |
| 12,145,052 B2 | 11/2024 | Khaira et al. |
| 12,145,053 B2 | 11/2024 | Khaira et al. |
| 2002/0173354 A1 | 11/2002 | Winans |
| 2005/0017953 A1 | 1/2005 | Pekka |
| 2005/0172045 A1 | 8/2005 | Bermudez et al. |
| 2005/0243585 A1 | 11/2005 | Marchant |
| 2005/0247550 A1 | 11/2005 | Hamada |
| 2006/0132458 A1 | 6/2006 | Garfio |
| 2006/0234794 A1 | 10/2006 | Baseflug et al. |
| 2006/0236002 A1 | 10/2006 | Valenci |
| 2007/0152965 A1 | 7/2007 | Krzyzanowski |
| 2007/0155511 A1 | 7/2007 | Grundstedt |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1 | 1/2011 | Penman et al. |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2013/0033829 A1 | 2/2013 | Furubo et al. |
| 2013/0077346 A1 | 3/2013 | Chen |
| 2013/0191625 A1 | 7/2013 | Mullens et al. |
| 2013/0225288 A1 | 8/2013 | Levin et al. |
| 2013/0237322 A1 | 9/2013 | Sobel |
| 2014/0018173 A1 | 1/2014 | Urhman |
| 2014/0024392 A1 | 1/2014 | Su |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1 | 10/2015 | Falc et al. |
| 2015/0281422 A1 | 10/2015 | Kessler et al. |
| 2016/0132114 A1 | 5/2016 | Rihn |
| 2016/0180811 A1 | 6/2016 | Colenbrander |
| 2016/0317919 A1 | 11/2016 | Gassoway et al. |
| 2016/0329533 A1 | 11/2016 | Tajima |
| 2017/0056762 A1 | 3/2017 | Gafni |
| 2017/0205881 A1 | 7/2017 | Yamashita |
| 2018/0004250 A1 | 1/2018 | Barnett et al. |
| 2018/0056176 A1 | 3/2018 | Sakamoto |
| 2018/0097860 A1 | 4/2018 | Daly |
| 2018/0133594 A1 | 5/2018 | Guo |
| 2018/0250588 A1 | 9/2018 | Winick |
| 2018/0345136 A1 | 12/2018 | Schmitz et al. |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0230400 A1 | 7/2019 | Van Os |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0154584 A1 | 5/2021 | O'Connor et al. |
| 2021/0197082 A1 | 7/2021 | Seibert et al. |
| 2021/0205699 A1 | 7/2021 | Chung |
| 2021/0275907 A1 | 9/2021 | Khaira et al. |
| 2021/0299553 A1 | 9/2021 | Lu et al. |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0105605 A1 | 4/2023 | Lu et al. |
| 2023/0271082 A1 | 8/2023 | Khaira et al. |
| 2023/0356076 A1 | 11/2023 | Maker |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0226721 A1 | 7/2024 | Lake et al. |
| 2024/0307760 A1 | 9/2024 | Aldridge et al. |
| 2024/0333804 A1 | 10/2024 | Wei et al. |
| 2024/0390786 A1 | 11/2024 | Aldridge et al. |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 208636809 U | 3/2019 |
| CN | 209392718 U | 9/2019 |
| CN | 113426104 A | 9/2021 |

(56) References Cited

FOREIGN PATENT DOCUMENTS

| | | | |
|---|---|---|---|
| CN | 115427123 A | 12/2022 | |
| CN | 115427123 B | 2/2024 | |
| EP | 1380324 A1 | 1/2004 | |
| EP | 1380324 B1 | 9/2005 | |
| EP | 2025369 A2 | 2/2009 | |
| EP | 2136225 A1 | 12/2009 | |
| EP | 2136225 B1 | 6/2012 | |
| EP | 3224691 B1 | 4/2018 | |
| EP | 3375502 A1 | 9/2018 | |
| EP | 3782709 A1 | 2/2021 | |
| EP | 4114540 A1 | 1/2023 | |
| GB | 2608588 A | 1/2023 | |
| JP | 2004139847 A | 5/2004 | |
| JP | 2014210079 A | 11/2014 | |
| JP | 2023516421 A | 4/2023 | |
| TW | 201036020 A | 10/2010 | |
| WO | WO2009/073819 | 6/2009 | |
| WO | WO2015/072625 | 5/2015 | |
| WO | WO2017/218303 | 12/2017 | |
| WO | WO2021/102146 A1 | 5/2021 | |
| WO | WO2021/178242 A1 | 9/2021 | |
| WO | WO2022/161834 A1 | 8/2022 | |
| WO | WO2023/034596 A1 | 3/2023 | |
| WO | WO2023/172202 A1 | 9/2023 | |
| WO | WO2024/006587 A1 | 1/2024 | |
| WO | WO2024/097301 A1 | 5/2024 | |
| WO | WO2024/107651 A1 | 5/2024 | |
| WO | WO2024/107654 A2 | 5/2024 | |
| WO | WO2024/137106 A1 | 6/2024 | |
| WO | WO2024/148214 A1 | 7/2024 | |
| WO | WO2024/248845 A1 | 12/2024 | |

OTHER PUBLICATIONS

US 12,047,455 B2, 07/2024, Wei et al. (withdrawn)
Office Action, Advisory Action, in U.S. Appl. No. 17/504,260, dated Nov. 14, 2024.
Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.
M-Con; obtained from the Internet on Nov. 17, 2024; URL: https://www.m-con.co/; 6 pages.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/866,166, filed Jul. 2022, Khaira et al.
U.S. Appl. No. 17/866,234, filed Jul. 2022, Khaira et al.
U.S. Appl. No. 17/987,772, filed Nov. 2022, Sorensen.
U.S. Appl. No. 18/076,121, filed Dec. 2022, Donlan et al.
U.S. Appl. No. 18/076,146, filed Dec. 2022, Wei et al.
U.S. Appl. No. 18/076,172, filed Dec. 2022, Chow et al.
U.S. Appl. No. 18/086,077, filed Dec. 2022, Maker.
U.S. Appl. No. 18/086,103, filed Dec. 2022, Maker.
U.S. Appl. No. 18/136,509, filed Apr. 2023, O'Connor.
U.S. Appl. No. 18/138,377, filed Apr. 2023, Sorensen et al.
U.S. Appl. No. 18/195,152, filed May 2023, Khaira.
U.S. Appl. No. 18/202,755, filed May 2023, Aldridge et al.
U.S. Appl. No. 18/214,917, filed Jun. 2023, O'Connor.
U.S. Appl. No. 18/214,949, filed Jun. 2023, O'Connor.
U.S. Appl. No. 18/224,508, filed Jul. 2023, Maker.
U.S. Appl. No. 18/226,883, filed Jul. 2023, Khaira et al.
U.S. Appl. No. 18/226,892, filed Jul. 2023, Boegli.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 18/746,611, filed Jun. 2024, Ivan Torres.
U.S. Appl. No. 18/734,411, filed Jun. 2024, Maker.
U.S. Appl. No. 18/739,527, filed Jun. 2024, Hong Tai Wei.
U.S. Appl. No. 18/777,919, filed Jul. 2024, Khaira et al.
U.S. Appl. No. 18/805,902, filed Aug. 2024, Khaira et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 17/504,299, dated Apr. 15, 2024.
Notice of allowance in U.S. Appl. No. 17/856,895, dated Apr. 16, 2024.
Notice of allowance in U.S. Appl. No. 18/224,508, dated Jan. 24, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 17/856,895, dated Mar. 12, 2024.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/195,152, dated Mar. 26, 2024.
Office Action in U.S. Appl. No. 18/224,508, dated Oct. 3, 2023.
Office Action in U.S. Appl. No. 18/405,077, dated May 7, 2024.
International Search Report and Written Opinion of the International Searching Authority issued in International Application No. PCT/US2021/019941, mailed Jun. 9, 2021 (12 pages).
International Search Report and Written Opinion of the International Searching Authority issued in International Application No. PCT/US2023/031919, mailed Nov. 17, 2023 (14 pages).
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
International Search Report and Written Opinion of the International Searching Authority issued in International Application No. PCT/US2023/081101, mailed Mar. 11, 2024 (19 pages).

(56) References Cited

OTHER PUBLICATIONS

International Search Report and Written Opinion of the International Searching Authority issued in International Application No. PCT/US2024/010404, mailed Apr. 24, 2024 (16 pages).

International Search Report and Written Opinion of the International Searching Authority, issued in International Application No. PCT/US2020/061291, mailed Feb. 24, 2021, 20 pages.

"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.

"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.

"Backbone One"; Mobile gaming hardware product page; Backbone; Dec. 9, 2022; 7 pages.

"Digital Depth: ALL Controller Universal & Fully Customizable"; Kickstarter project page for customizable game controller; Digital Depth Inc.; Aug. 4, 2021; 25 pages.

"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.

"Game Center"; Apple Developer Game Center overview; downloaded from the Internet on Nov. 29, 2022 at https://developer.apple.com/game-center/; Apple Inc.; 2022; 4 pages.

"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.

"GitHub—Kofktu/PIPKit: Picture in Picture iOS"; downloaded from the Internet on Nov. 27, 2022 at https://github.com/Kofktu/PIPKit; GitHub, Inc.; 2022; 11 pages.

"How to implement Picture in Picture Webview on IOS Swift?"; StackOverflow Questions; downloaded from the Internet on Nov. 28, 2022 at https://stackoverflow.com/questions/69565199/hot-to-implement-picture-in-picture-webview-on-ios-swift; StackOverflow; Oct. 14, 2021; 2 pages.

"PhoneJJoy Play: Turn your phone into a console!"; Kickstarter project page for compact gamepad; PhoneJoy Solutions America, Inc.; Jul. 29, 2014; 42 pages.

"Picture-in-picture (PiP) support"; Andriod Developers UI Guide; downloaded from the Internet on Nov. 27, 2022 at https://developer.android.com/develop/ui/views/picture-in-picture; Nov. 11, 2022; 10 pages.

"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.

"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.

"Rays Proo"; Pioneer Rays™ Pro earbuds product page; downloaded from the Internet on Aug. 16, 2023 at Rayz Pro Earphone—Pioneer Rayz; Pioneer Rayz; 2023; 9 pages.

"User Notification: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.

"Why queue in geforce now so long?I try to answer for this question" Reddit. GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.

Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].

Box.co.uk; "How Does the Samsung Gaming Hub Work?"; YouTube product tutorial; downloaded from the Internet on Nov. 29, 2022 at https://www.youtube.com/watch?v=uAT4tZR3mNK; YouTube; Oct. 2022; 5 pages.

Dickinson, "Instant Replay: Building a Game Engine with Reproducible Behavior," Jul. 13, 2001, Retrieved from the Internet: URL: http://

Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.

Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27; 2021; 12 pages.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—Game Revolution; Game Revolution; Dec. 13, 2021; 6 pages.

Max Tech; Backbone One Review—The BEST iPhone Gaming Controller!; YouTube product review video; downloaded from the Internet on Nov. 29, 2022 at https://www.youtube.com/watch?v=zRJQjt2nzDo; YouTube; Jun. 2022; 4 pages.

Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.

Schofield, T.; "Logitech G Cloud Unboxing and Hands On!"; YouTube product review video; downloaded from the Internet on Nov. 29, 2022 at https://www.youtube.com/watch?v=speoPL5vqX0; YouTube; Nov. 2022; 3 pages.

Sholtz, M.; "The Razer Kishi V2 offers a new Virtual Controller mode, and it's pretty slick"; Android Police Newsletter article; downloaded from the Internet on Aug. 16, 2023 at The Razer Kishi V2 offers a new Virtual Controller mode, and it's pretty slick (androidpolice.com); Jan. 21, 2023; 7 pages.

Tech & Design; "How to Set Up New Nintendo Switch | Beginners Guide | First Time Turning On"; YouTube product review video; downloaded from the Internet on Nov. 29, 2022 at https://www.youtube.com/watch?v=XtMcQ9IAkCc; YouTube; 2021; 4 pages.

Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.

Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-applies-2020-gaming-updates/; MacStories, Inc.; Aug. 27, 2020; 14 pages.

Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.

Notice of allowance in U.S. Appl. No. 17/504,283, dated May 29, 2024.

Notice of allowance in U.S. Appl. No. 17/504,299, dated Jun. 12, 2024.

(56) References Cited

OTHER PUBLICATIONS

Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/076,146, dated Jul. 22, 2024.
Notice of allowance in U.S. Appl. No. 18/086,103, dated May 28, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
Office Action in U.S. Appl. No. 17/504,260, dated Jul. 23, 2024.
International Search Report and Written Opinion of the International Searching Authority issued in International Application No. PCT/US2024/019901, mailed Jul. 17, 2024 (15 pages).
International Search Report and Written Opinion of the International Searching Authority issued in International Application No. PCT/US2023/079521, mailed May 24, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.
GameSir g8 Plus Bluetooth Mobile Controller⇒Big Enough As You Want—GameSir Officiaal Store, obtained from the Internet on Oct. 10, 2024; URL: https://www.gamesir.hk/blogs/news/gamesir-g8-plus-bluetooth-mobie-controller-big-enough-as-you-want, 8 pages.
Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.
Nintendo Switch—Nintendo—Official Site, obtained from the Internet on Oct. 10, 2024; URL: https://www.nintendo.com/us/switch/system/, 17 pages.
Nintendo switch internal—Search Images (bing.com)m obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gf12WiRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglscJv9w%26pid%3dImgRaw%26r%3d0&exph=355&expw=474&q=nintendo+switch+internal&simid=608038160133663134&FORM=IRPRST&ck=C6F7BED9A8A0BA549A06B2B38B157AFA&selectedIndex=1&itb=0&ajaxhist=0&ajaxserp=0, 4 pages.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
U.S. Appl. No. 18/813,384, filed Aug. 2024, Maker.
U.S. Appl. No. 18/915,580, filed Oct. 2024, Khaira et al.
U.S. Appl. No. 18/915,648, filed Oct. 2024, Khaira et al.
U.S. Appl. No. 18/942,103, filed Nov. 2024, Scott et al.
U.S. Appl. No. 18/945,830, filed Nov. 2024, Khaira et al.
U.S. Appl. No. 18/962,755, filed Nov. 2024, Khaira et al.
U.S. Appl. No. 18/967,940, filed Dec. 2024, Khaira et al.
Notice of Allowance in U.S. Appl. No. 17/504,260, dated Dec. 9, 2024.
Notice of Allowance in U.S. Appl. No. 18/405,077, dated Dec. 12, 2024.
Office Action in U.S. Appl. No. 18/076,172, dated Dec. 2, 2024.
International Search Report and Written Opinion of the International Searchinh Authorityissued in International Application No. PCT/US2024/039193, mailed Nov. 11, 2024 (16 pages).
International Search Report and Written Opinion of the International Searching Authority issued in International Application No. PCT/US2024/039487, mailed Nov. 18, 2024 (20 pages).
International Search Report and Written Opinion of the International Searching Authority issued in International Application No. PCT/US2024/042461, mailed Nov. 12, 2024 (13 pages).
Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 p. 3, 5 pages.
Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.
ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.

DYNAMICALLY CHANGING BUTTON INDICIA FOR A GAME CONTROLLER

CROSS-REFERENCE TO RELATED APPLICATION

The present application is a continuation of U.S. patent application Ser. No. 18/086,103, filed Dec. 21, 2022, the contents of which are incorporated herein by reference in their entirety.

TECHNICAL FIELD

The subject matter is related to an apparatus and methods for marking buttons on a gaming input device, and, more particularly, to an apparatus and methods for dynamically changing button indicia through illumination of various layers.

BACKGROUND

Gaming input devices, such as handheld controllers, typically have a series of buttons for taking user input, where the separate buttons serve different functions. These buttons are typically marked—for example, with shapes, symbols, or letters—to designate each button's function. Most often, buttons are marked permanently in some way, through printing, etching, or other means. But individual buttons may have multiple functions. For instance, one button may be used to access a settings menu, and it may be further used to make selections within the settings menu. Accordingly, buttons on gaming input devices must sometimes be marked with more than one marking or must otherwise be able to indicate more than one function.

Some gaming input devices exist on the market that interface with mobile devices to simulate the traditional console experience. Such devices can mimic the experience, particularly the button and joystick configurations, of more than one console type and allow users to switch between modes of gameplay. To accomplish this, buttons on these devices must be capable of displaying more than one marking, allowing a user to read the markings and determine which marking is applicable for a particular gaming experience. Devices currently on the market permanently mark buttons with more than one function. For example, a button may be marked with both an "X" and an "A," indicating to the user the available functions of that button.

But permanently marking buttons with more than one marking can be confusing to the user. Particularly in fast-paced gaming environments, a user may not immediately be able to determine the proper function of a button due to misreading or due simply to needing an extra moment to process which marking applies. The user may need "X" but not see an "X" quickly enough because of the presence of an "A." Although the flexibility of switching between gaming modes is desirable, current gaming input devices do not offer the most user-friendly experience.

Configurations of the disclosed technology address shortcomings in the prior art.

DETAILED DESCRIPTION

As described herein, aspects are directed to dynamically changing button indicia for gaming input devices. Configurations of the disclosure include buttons that utilize multiple sources of light and a layered button structure to illuminate different indicia and thus display different indicia at the surface of the button. Accordingly, configurations of the disclosure limit the clutter of permanent markings on gaming input devices, limit confusion for users, and allow for flexibility between modes of gameplay or button function for various games.

Figure 1:
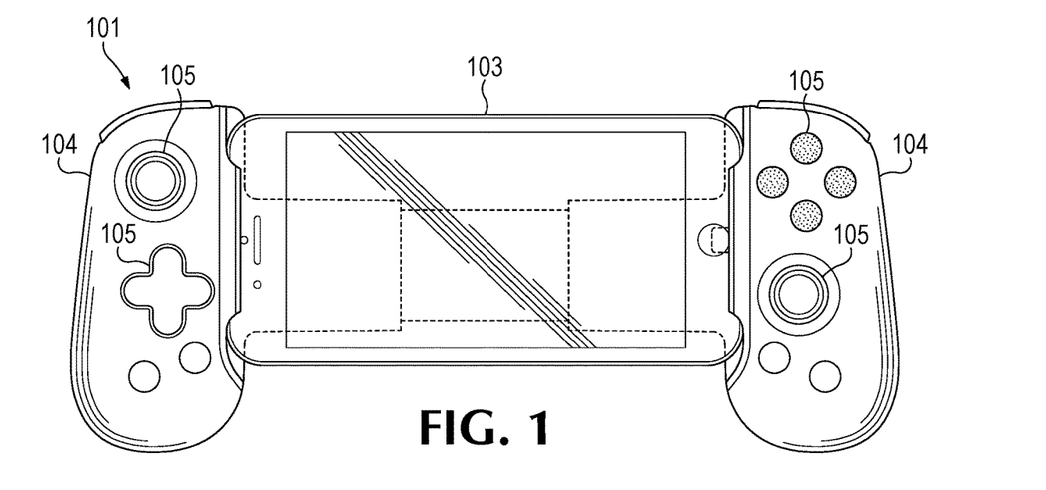
FIG. 1 is a front view of an example gaming input device that may be used in configurations.

FIG. 1 depicts a front view of an example gaming input device 101 that may be used in configurations of the disclosed technology. As illustrated in FIG. 1, the gaming input device 101 interfaces with a mobile device 103, and the gaming input device 101 may be capable of replicating the console controller experiences of consoles like XBOX™ and PlayStation™ or otherwise serving as an input device for a variety of games to be played on the mobile device 103. For purposes of the disclosure, "mobile device" refers to a portable, handheld computing device, such as a smartphone, tablet, or other comparable mobile device. The gaming input device 101 may be, for example, the game controller for a mobile device as disclosed in patent U.S. Pat. No. 11,389, 721. As illustrated in FIG. 1, the game controller 101 includes handles 104. Each handle 104 in the example configuration includes user-accessible, hardware interfaces 105, such as one or more of a button, an analog stick, a touchscreen, a touchpad, a knob, a slider, a switch, a wheel, a dial, a directional pad, or another such feature configured to accept touch inputs from a user's finger or a stylus. One or more of the user-accessible, hardware interfaces 105 may be dynamically changing buttons 100, as described more fully below.

Figure 2:
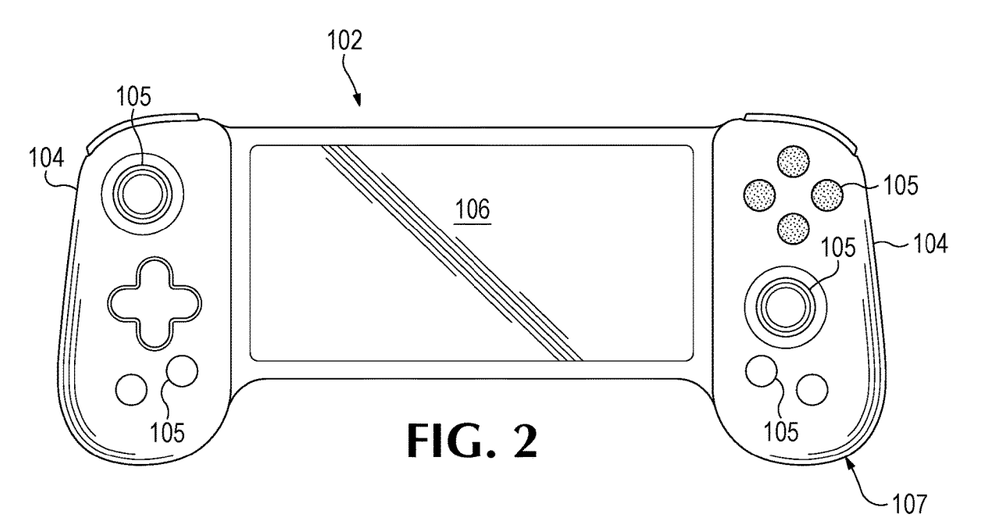
FIG. 2 is a front view of another example gaming input device that may be used in configurations.

FIG. 2 depicts a front view of another example gaming input device 102 that may be used in configurations of the disclosed technology. As with the gaming input device 101 of FIG. 1, the gaming input device 102 of FIG. 2 may be capable of replicating the console controller experiences of consoles like XBOX™ and PlayStation™ or otherwise serving as an input device for a variety of games to be played on the gaming input device 102. As illustrated in FIG. 2, the gaming input device 102 includes a display screen 106 integrated into a handheld game controller 107 and does not require interfacing with a user's mobile device 103. The gaming input device 102 further includes handles 104. Each handle 104 in the example configuration includes user-accessible, hardware interfaces 105, such as one or more of a button, an analog stick, a touchscreen, a touchpad, a knob, a slider, a switch, a wheel, a dial, a directional pad, or another such feature configured to accept touch inputs from a user's finger or a stylus. One or more of the user-accessible, hardware interfaces 105 may be dynamically changing buttons 100, as described more fully below.

For purposes of the discussion that follows, references to a gaming input device could refer to the gaming input device 101 of FIG. 1, the gaming input device 102 of FIG. 2, or any other gaming input device having physical buttons. Also, as used in this disclosure, "indicia" means the shapes, symbols, letters, or other markings on a button and that designate the button's function.

Figure 3:
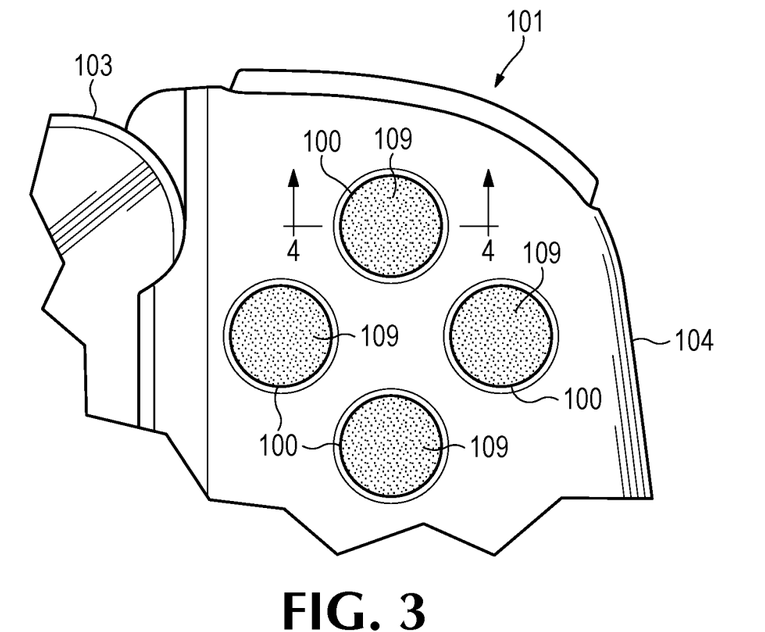
FIG. 3 is a detail view of a handle of a gaming input device, such as the gaming input device of either FIG. 1 or FIG. 2, also showing the dynamically changing buttons in an example third configuration where the buttons appear blank or dark.
Figure 4:
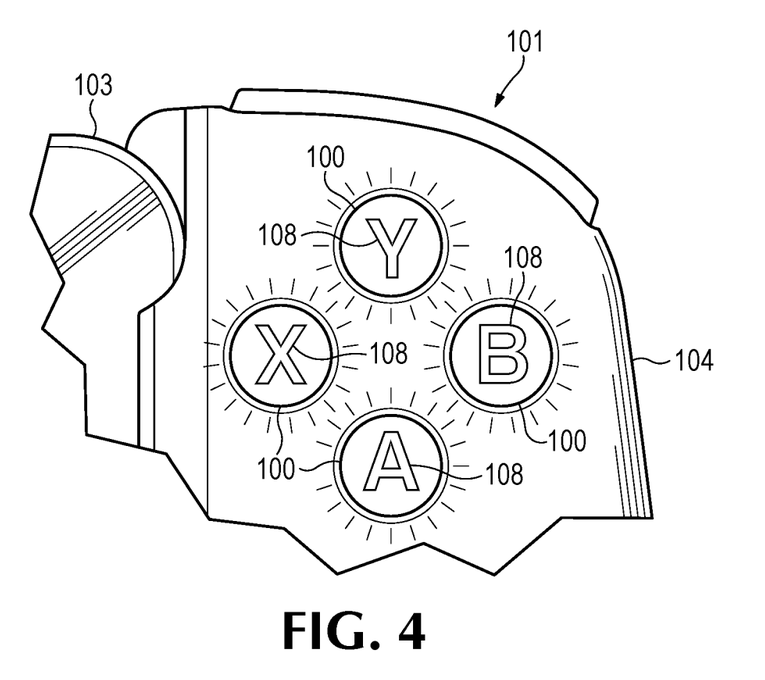
FIG. 4 is a detail view of the handle of FIG. 3, showing the dynamically changing buttons being illuminated in an example first configuration.
Figure 5:
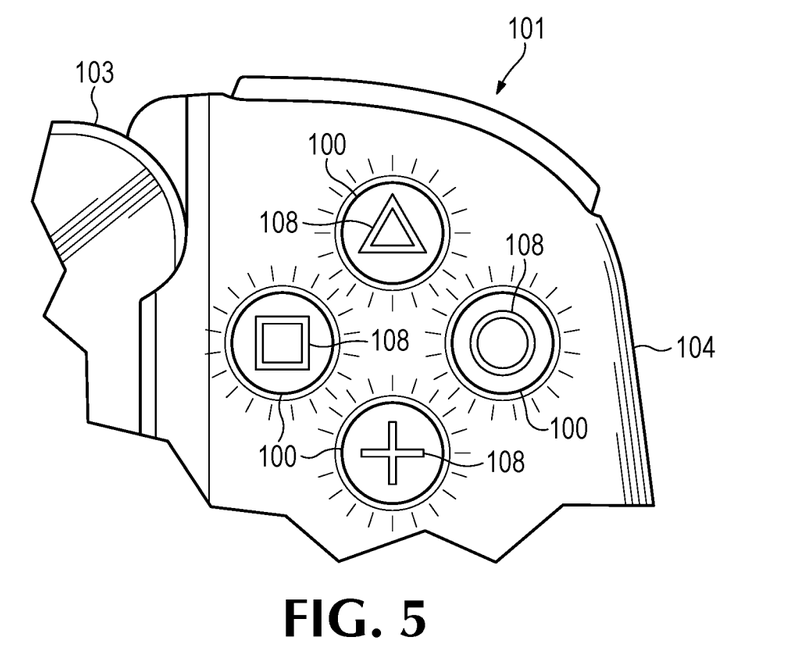
FIG. 5 is a detail view of the handle of FIG. 3, showing the dynamically changing buttons being illuminated in an example second configuration.

FIG. 3 is a detail view of a handle 104 of a gaming input device. As illustrated in FIG. 3, the handle 104 may include one or more dynamically changing buttons 100. The dynamically changing buttons 100 display different indicia 108 to match the appropriate gameplay environment. For example, as illustrated in FIG. 4, the dynamically changing buttons 100 may follow a first configuration and display indicia 108 associated with those on XBOX™ controllers, without displaying other indicia. In addition, as illustrated in FIG. 5, the same dynamically changing buttons 100 may instead follow a second configuration and display indicia 108 associated with those on PlayStation™ controllers. The references to indicia associated with those on XBOX™ controllers and to indicia associated with those on XBOX™ controllers are used as examples only, as they would be familiar to most game players. The indicia 108, however, are not limited to those configurations and could include any indicia necessary or useful for gameplay or other activities with the gaming input device.

In configurations, when the gaming input device is not in use, or when a mode of use has not been selected, the dynamically changing buttons 100 appear blank or dark, as illustrated in FIG. 3, because they are not internally illuminated in this third configuration. As discussed in further detail below, the dynamically changing buttons 100 thus display a dark background without visible indicia 108.

In configurations, each of the dynamically changing buttons 100 is controlled individually. In such versions, then, the buttons 100 do not need to all be in the same configuration. Hence, for example, some buttons 100 could be in the first configuration, some could be in the second configuration, and some could be in the third configuration. In other configurations, all of the dynamically changing buttons 100 are in the same configuration.

Accordingly, in versions, the gaming input device may have dynamically changing buttons 100 that are configured to change between an "off" configuration in which the dynamically changing buttons 100 are not internally illuminated and at least one "on" configuration in which the dynamically changing buttons 100 are internally illuminated. In some example versions, there may be only one marking layer, such as the first marking layer 110, and one light source, such as the first light source 112. In other example versions, there may be more than one marking layer, such as the first marking layer 110 and the second marking layer 113, and more than one light source, such as the first light source 112 and the second light source 115. In other example versions, the gaming input device may have dynamically changing buttons 100 that are configured to change between at least two different "on" configurations in which the dynamically changing buttons 100 are internally illuminated, in which the "on" configurations are different because different indicia 108 are illuminated or because one or more of the indicia 108 that are illuminated in one of the "on" configurations is not illuminated in the other "on" configuration. These example versions may or may not include the top casing 109 (described below) in all versions of such configurations. Also, the dynamically changing buttons 100 may be controlled individually or all together in these example versions.

Figure 6:
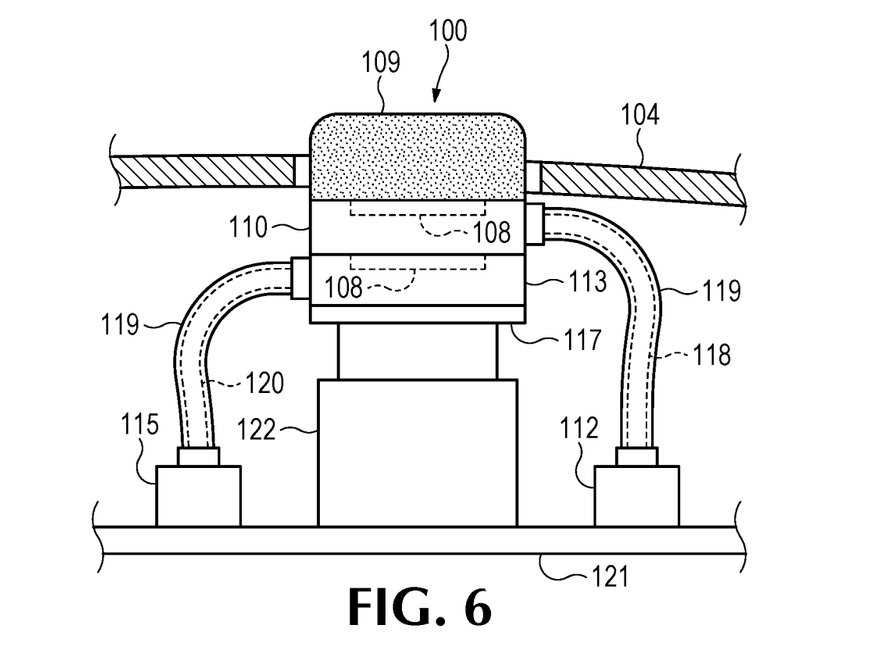
FIG. 6 is a partial sectional view depicting an example layered structure for a dynamically changing button.
Figure 7:
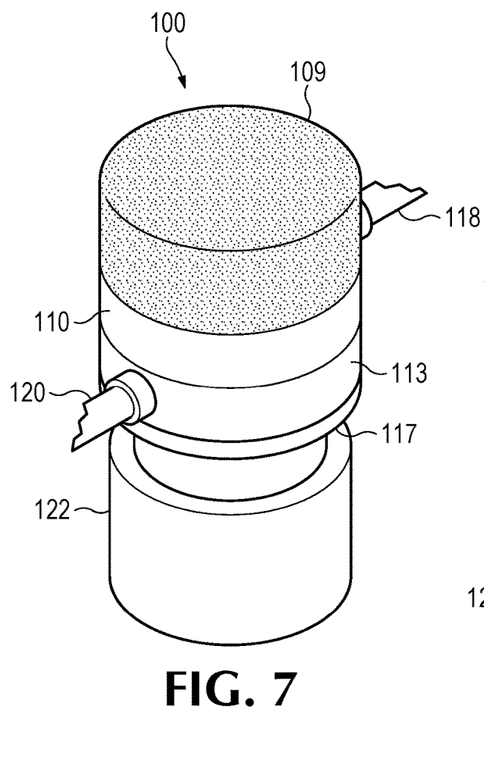
FIG. 7 is a perspective view of the dynamically changing button of FIG. 6.
Figure 8:
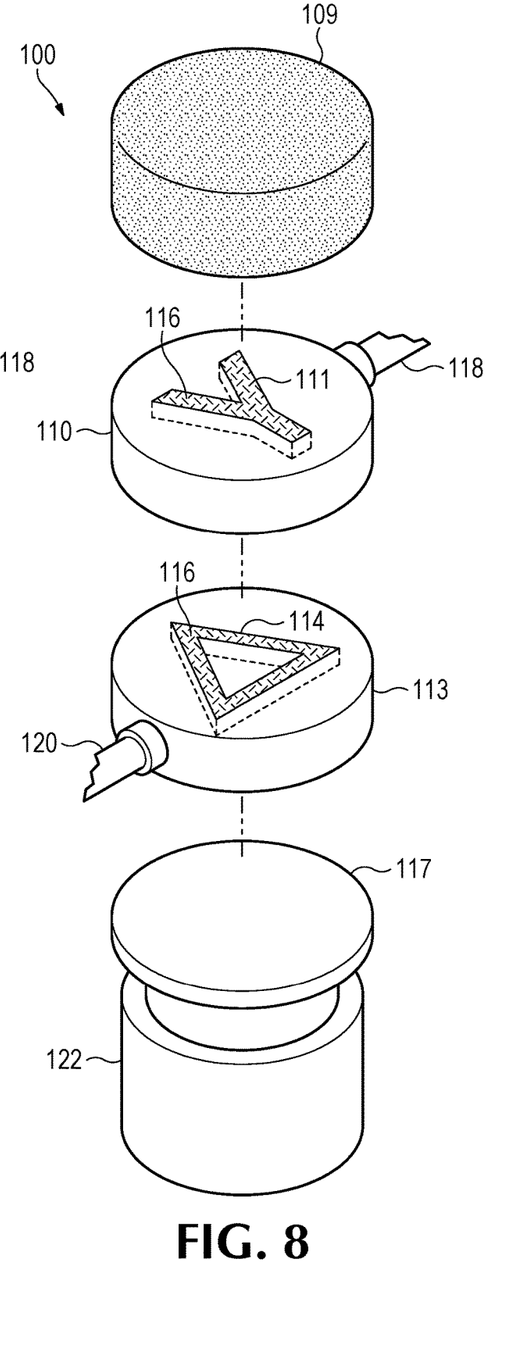
FIG. 8 is an exploded view of the dynamically changing button of FIG. 7.

FIG. 6 depicts an example of a layered structure for the dynamically changing buttons 100, according to example configurations. FIG. 7 is a perspective view of the dynamically changing button of FIG. 6, and FIG. 8 is an exploded view of the dynamically changing button of FIG. 7. As illustrated in FIGS. 6-8, the dynamically changing buttons 100 may include a top casing 109. The top casing 109 is semi-transparent and may be tinted to give the dynamically changing buttons 100 a dark, smoky appearance when the indicia 108 are not internally illuminated, while allowing light to pass through and display the indicia 108 when the indicia 108 are internally illuminated. In the illustrated configuration, below the top casing 109 is a first marking layer 110 with a first indicia 111. The first marking layer 110 receives light from a first light source 112, as described further below, illuminating the first indicia 111 and allowing the first indicia 111 to be displayed through the top casing 109 and thus displayed to the user. In the illustrated configuration, below the first marking layer 110 is a second marking layer 113, which includes a second indicia 114. The second marking layer 113 receives light from a second light source 115, which is separate from the first light source 112.

In versions, the first light source 112 and the second light source 115 may emit light that is colored, meaning that the emitted light is not white.

The first marking layer 110 and the second marking layer 113 are transparent, allowing light to shine through, but each is tinted with a color corresponding to its respective light source. In other words, the tinting is substantially the same color as the light emitted from the respective light source. As used in this context, "substantially the same color" means that the two colors are closely situated to each other in a defined color space. An example of a standard color space is the Adobe RGB (1998), or opRGB, color space, which is also defined by International Electrotechnical Commission standard IEC 61966-2-5:1999. Color spaces often use the CIE xy chromaticity diagram, derived from experiments performed by the International Commission on Illumination, to describe the color space by referring to x- and y-coordinates on the CIE xy chromaticity diagram. Hence, for example, the primary color blue may be described as have an x-coordinate of 0.15 and a y-coordinate of 0.06 on the CIE xy chromaticity diagram. Accordingly, two colors may be "substantially the same color" as used in this disclosure if the x-coordinate and the y-coordinate are each within 0.2 of the respective coordinate of the two colors. Hence, using the example of the primary color blue having an x-coordinate of 0.15 and a y-coordinate of 0.06, a substantially similar color would have (i) an x-coordinate between 0.0 and 0.35, and (ii) a y-coordinate between 0.0 and 0.26. As another example, the primary color green may have an x-coordinate of 0.21 and a y-coordinate of 0.71 on the CIE xy chromaticity diagram. In that example, a substantially similar color would have (i) an x-coordinate between 0.01 and 0.41, and (ii) a y-coordinate between 0.51 and 0.91. In reality, some of these example values would fall outside of the visible spectrum. Hence, the actual boundaries of what is "substantially the same color" would be further limited to colors within the visible spectrum.

Figure 9:
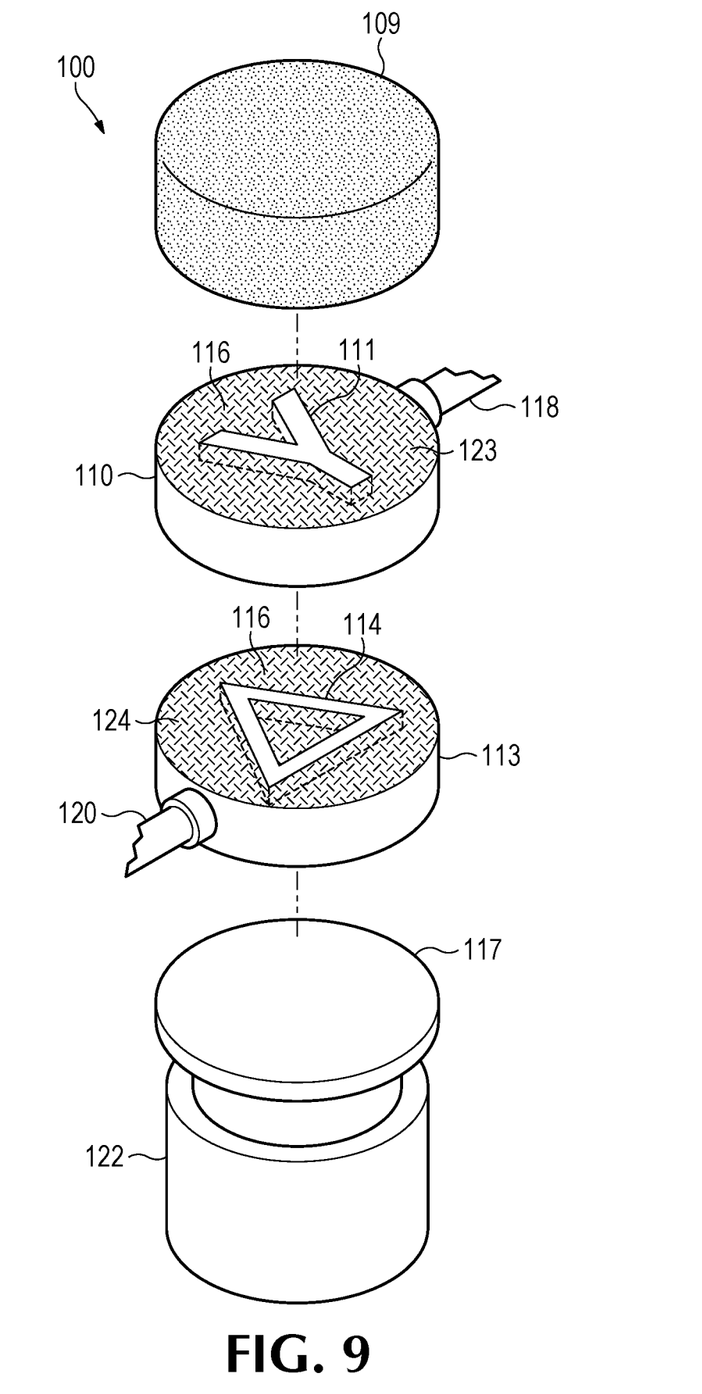
FIG. 9 illustrates an alternative of the configuration shown in FIG. 8.

As such, the dynamically changing buttons 100 will illuminate either the first marking layer 110 or second marking layer 113 and display either the first indicia 111 or the second indicia 114 to the user. Each of the first marking layer 110 and the second marking layer 113 may also include texturing or etching 116 for scattering light from the respective light source to make the indicia 108 more visible. The texturing 116 may be, for example, frosting on the marking layer. Specifically, the texturing 116 is configured to redirect light from the respective light source toward the top casing 109. In configurations, the texturing 116 is configured to concentrate light rays on the indicia of the respective marking layer by allowing the light emitted from the respective light source to pass through transparent (non-textured or -etched) portions but break and reflect from the textured or etched portions. While FIG. 8 illustrates the texturing 116 as coinciding with the indicia, in configurations the texturing 116 may instead or also coincide with the surface of the marking layer surrounding the indicia. Accordingly, FIG. 9 shows an example of texturing 116 on the top surface 123 of the first marking layer 110 and on the top surface 124 of the second marking layer 113. As noted, the texturing 116 may also be on both the top surface and the indicia.

As illustrated, the dynamically changing buttons 100 also include a base layer 117, which may be made of a light-colored, substantially opaque material in example configurations. As used in this context, "substantially opaque" means largely or essentially impenetrable to light, without requiring perfect barricade to all light. The light-colored material may be, for example, white, at least on a surface of the base layer 117 facing the marking layers. This light, substantially opaque material allows for uniform distribution of the light sources in the first marking layer 110 and the second marking layer 113, contributing to the evenness of the first indicia 111 and the second indicia 114 at the surface by reflecting toward the top casing 109 light that might otherwise be absorbed by a darker-colored base layer 117. In configurations, the light-colored material may be a light shade of grey. As used in this context, if 0% is pure white and 100% is pure black, the light shade of grey may be 10% or less.

As illustrated, the dynamically changing buttons 100 also include a button base 122. The button base 122 couples the dynamically changing buttons 100 to the printed circuit board 121. The button base 122 may also include a spring mechanism, such as a compression spring, to allow the dynamically changing buttons 100 to be depressed by the user, such as during typical gameplay.

As noted above, the dynamically changing buttons 100 utilize multiple light sources to accomplish illuminating different indicia 108 at different times. With reference to the example configuration illustrated in FIG. 6, the first marking layer 110 is connected to a first light pipe 118. The first light pipe 118 is connected to a first light source 112 and conveys light from the first light source 112 to the first marking layer 110 to illuminate the first indicia 111. The first light pipe 118 is surrounded by a substantially opaque material 119 to help prevent leakage of light through the first light pipe 118 and to help increase the amount of light reaching the first indicia 111. The opaque material 119 also reduces the amount of light from the first light pipe 118 that may leak to the second indicia 114 and illuminate the second indicia 114 when not desired. When the light from the first light source 112 illuminates the first indicia 111, the first indicia 111 is visible to the user through the top casing 109, without displaying the second indicia 114. Similarly, when the second indicia 114 is needed instead of the first indicia 111, a second light source 115 may send light through a second light pipe 120 to the second marking layer 113 and illuminate the second indicia 114. The second light pipe 120 is likewise surrounded by a substantially opaque material 119. Each of the first light source 112 and the second light source 115 may be, for example, coupled to a printed circuit board 121 within the handle 104.

In sum, alternating between modes of gameplay involves alternating between the first light source 112 and the second light source 115, which in turn leads to the illumination of either the first indicia 111 or the second indicia 114 from the perspective of the user. Illumination by light sources within the handle 104, such as the first light source 112 and the second light source 115, is what is meant by being "internally illuminated" in this disclosure, contrasted with external illumination coming from light sources outside of the game controller.

Figure 10:
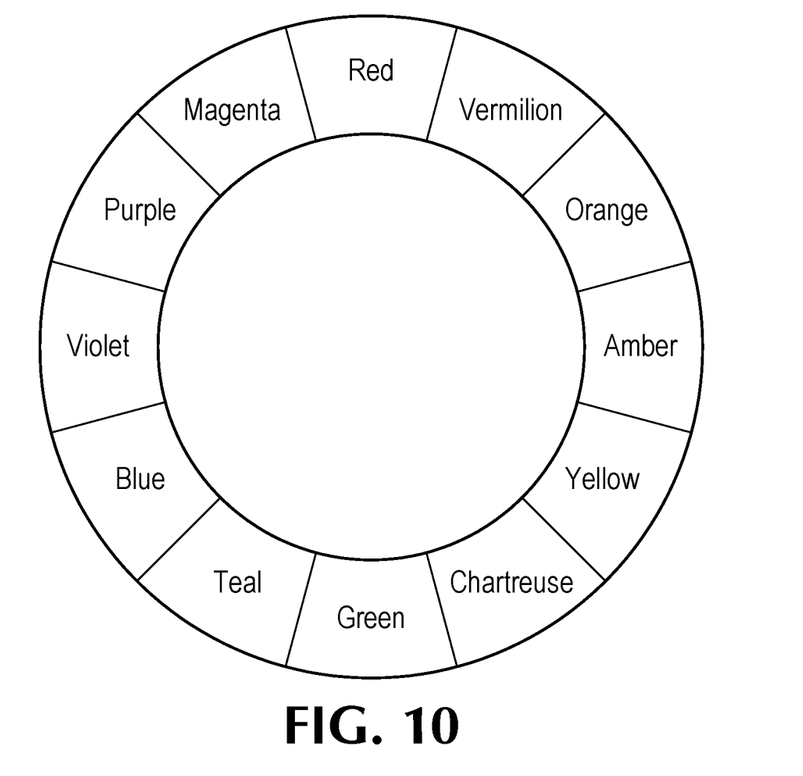
FIG. 10 is an example of a color wheel.

As mentioned, in configurations of the disclosure, each of the first marking layer 110 and the second marking layer 113 is transparent but tinted with a color corresponding to each of the first light source 112 and the second light source 115. In configurations, the colors of the tinting and of the first light source 112 and the second light source 115 are selected to be complementary colors, meaning colors that are on opposite sides of a standard color wheel (e.g., blue and orange, green and red, yellow and purple). An example of a standard color wheel is provided in FIG. 10. Such complementary colors, when mixed, tend to cancel each other out by producing a grayscale color. When the colors are selected in this way, the tinting of the first marking layer 110 tends to reinforce light emitted from the first light source 112 and to diminish any light leaking through from the second marking layer 113 and its opposite tinting. Likewise, the second marking layer 113 tends to reinforce light emitted from the second light source 115 and to diminish any light leaking through from the first marking layer 110 and its opposite tinting. Accordingly, such color selection may enhance the visibility of one of the indicia 108 (for example, the first indicia 111) and limit any potential leak-through of the other of the indicia 108 (for example, the second indicia 114).

In configurations, the colors of the tinting and of the first light source 112 and the second light source 115 are selected to be near-complementary colors, meaning colors that are adjacent to the color on the opposite side of a standard color wheel. With reference to the example color wheel in FIG. 10, the near-complementary colors of green would be magenta and vermilion. Similarly, the near-complimentary colors of blue would be vermilion and amber. In the same way, the near-complimentary colors of violet would be orange and yellow.

Hence, for example, one of the first light source 112 or the second light source 115 may emit light that is blue, while the other of the first light source 112 or the second light source 115 emits light that is orange. As another example, one of the first light source 112 or the second light source 115 may emit light that is green, while the other of the first light source 112 or the second light source 115 emits light that is purple. As yet another example, one of the first light source 112 or the second light source 115 may emit light that is yellow, while the other of the first light source 112 or the second light source 115 emits light that is purple. As still another example, one of the first light source 112 or the second light source 115 may emit light that is red, while the other of the first light source 112 or the second light source 115 emits light that is green.

Even so, this disclosure does not necessarily require selection of complementary or near-complementary colors on a color wheel and should not be read to limit color selection in those ways.

As described above, in embodiments the dynamically changing buttons 100 may display indicia reflecting a single mode of gameplay at a time, such as XBOX™ indicia, when a user is engaged in a game. All the while, the dynamically changing buttons 100 maintain the ability to switch to a different set of indicia, such as PlayStation™ indicia, without displaying any extra and potentially confusing markings to the user. Nonetheless, configurations of the disclosure may allow both marking layers to be illuminated simultaneously.

While described above with regard to buttons, the disclosed technology and concepts can also be applied to other types of user-accessible, hardware interfaces 105, including knobs, sliders, switches, dials, directional pads, and other such features configured to accept touch inputs from a user's finger or a stylus and that include indicia.

Furthermore, the disclosed technology and concepts can also be applied to other types of user-accessible, hardware interfaces that are not components of gaming devices. Hence, the disclosed technology and concepts can be used on other user-accessible, hardware interfaces—such as buttons, knobs, sliders, switches, dials, directional pads, and other such features configured to accept touch inputs from a user's finger or a stylus—where there would be a benefit to displaying different indicia on the user-accessible, hardware interface at different times.

EXAMPLES

Illustrative examples of the disclosed technologies are provided below. A particular configuration of the technologies may include one or more, and any combination of, the examples described below.

Example 1 includes a gaming device, comprising a handheld controller including a handle, and a depressible button on the handle configured to receive user input, the depressible button comprising: a first marking layer including a first indicia; a first light source configured to illuminate the first indicia in the first marking layer; a second marking layer stacked with the first marking layer and including a second indicia; and a second light source configured to illuminate the second indicia in the second marking layer.

Example 2 includes the gaming device of Example 1, in which the depressible button further comprises a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

Example 3 includes the gaming device of Example 2, in which the top casing has a smoky tint.

Example 4 includes the gaming device of any of Examples 1-3, in which the depressible button further comprises a substantially opaque base layer, the second marking layer being between the base layer and the first marking layer.

Example 5 includes the gaming device of Example 4, in which the base layer is white.

Example 6 includes the gaming device of Example 4, in which the base layer is a light shade of grey.

Example 7 includes the gaming device of any of Examples 1-6, in which the first light source is configured to illuminate the first indicia in the first marking layer in an "on" status of the first light source and to not illuminate the first indicia in the first marking layer in an "off" status of the first light source, in which the second light source is configured to illuminate the second indicia in the second marking layer in an "on" status of the second light source and to not illuminate the second indicia in the second marking layer in an "off" status of the second light source, in which the first light source is configured to be in the "off" status of the first light source when the second light source is in the "on" status of the second light source, and in which the second light source is configured to be in the "off" status of the second light source when the first light source is in the "on" status of the first light source.

Example 8 includes the gaming device of any of Examples 1-7, in which the first light source emits light that is colored, and in which the first marking layer is tinted in a first-marking-layer color that is substantially the same color as the light emitted from the first light source.

Example 9 includes the gaming device of any of Examples 1-8, in which the second light source emits light that is colored, and in which the second marking layer is tinted in a second-marking-layer color that is substantially the same color as the light emitted from the second light source.

Example 10 includes the gaming device of Example 9, in which the first-marking-layer color and the second-marking-layer color are complementary colors.

Example 11 includes the gaming device of Example 9, in which one of the first light source or the second light source emits light that is colored blue, and the other of the first light source or the second light source emits light that is colored orange.

Example 12 includes the gaming device of Example 9, in which one of the first light source or the second light source emits light that is colored green, and the other of the first light source or the second light source emits light that is colored purple.

Example 13 includes the gaming device of Example 9, in which one of the first light source or the second light source emits light that is colored yellow, and the other of the first light source or the second light source emits light that is colored purple.

Example 14 includes the gaming device of Example 9, in which one of the first light source or the second light source emits light that is colored red, and the other of the first light source or the second light source emits light that is colored green.

Example 15 includes the gaming device of any of Examples 1-14, in which the first marking layer includes texturing configured to scatter light emitted by the first light source.

Example 16 includes the gaming device of any of Examples 1-15, in which the second marking layer includes texturing configured to scatter light emitted by the second light source.

Example 17 includes the gaming device of any of Examples 1-16, in which the depressible button further comprises: a first light pipe configured to convey light emitted by the first light source to the first marking layer; and a second light pipe configured to convey light emitted by the second light source to the second marking layer.

Example 18 includes a depressible button for a gaming device, the depressible button comprising: a first marking layer including a first indicia; a first light source configured to illuminate the first indicia in the first marking layer; a second marking layer stacked with the first marking layer and including a second indicia; and a second light source configured to illuminate the second indicia in the second marking layer.

Example 19 includes the depressible button of Example 18, further comprising a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

Example 20 includes the depressible button of Example 19, in which the top casing has a smoky tint.

Example 21 includes the depressible button of any of Examples 18-20, further comprising a substantially opaque base layer, the second marking layer being between the base layer and the first marking layer.

Example 22 includes the depressible button of Example 21, in which the base layer is white.

Example 23 includes the depressible button of Example 21, in which the base layer is a light shade of grey.

Example 24 includes the depressible button of any of Examples 18-23, in which the first light source is configured to illuminate the first indicia in the first marking layer in an "on" status of the first light source and to not illuminate the first indicia in the first marking layer in an "off" status of the first light source, in which the second light source is configured to illuminate the second indicia in the second marking layer in an "on" status of the second light source and to not illuminate the second indicia in the second marking layer in an "off" status of the second light source, in which the first light source is configured to be in the "off" status of the first light source when the second light source is in the "on" status of the second light source, and in which the second light source is configured to be in the "off" status of the second light source when the first light source is in the "on" status of the first light source.

Example 25 includes the depressible button of any of Examples 18-24, in which the first light source is configured to emit light that is colored, and in which the first marking layer is tinted in a first-marking-layer color that is substantially the same color as the light emitted from the first light source.

Example 26 includes the depressible button of any of Examples 18-25, in which the second light source is configured to emit light that is colored, and in which the second marking layer is tinted in a second-marking-layer color that is substantially the same color as the light emitted from the second light source.

Example 27 includes the depressible button of Example 26, in which the first-marking-layer color and the second-marking-layer color are complementary colors.

Example 28 includes the depressible button of any of Examples 18-27, in which the first marking layer includes texturing configured to scatter light emitted by the first light source.

Example 29 includes the depressible button of any of Examples 18-28, in which the second marking layer includes texturing configured to scatter light emitted by the second light source.

Example 30 includes the depressible button of any of Examples 18-29, further comprising: a first light pipe configured to convey light emitted by the first light source to the first marking layer; and a second light pipe configured to convey light emitted by the second light source to the second marking layer.

Example 31 includes a user-accessible, hardware interface configured to accept touch inputs, the hardware interface comprising: a first marking layer including a first indicia; a first light source configured to illuminate the first indicia in the first marking layer; a second marking layer stacked with the first marking layer and including a second indicia; and a second light source configured to illuminate the second indicia in the second marking layer.

Example 32 includes the hardware interface of Example 31, further comprising a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

Example 33 includes the hardware interface of any of Examples 31-32, further comprising a substantially opaque base layer, the second marking layer being between the base layer and the first marking layer.

Example 34 includes the hardware interface of any of Examples 31-33, in which the first light source is configured to emit light that is colored, and in which the first marking layer is tinted in a first-marking-layer color that is substantially the same color as the light emitted from the first light source.

Example 35 includes the hardware interface of any of Examples 31-34, in which the second light source is configured to emit light that is colored, and in which the second marking layer is tinted in a second-marking-layer color that is substantially the same color as the light emitted from the second light source.

Example 36 includes the hardware interface of Example 35, in which the first-marking-layer color and the second-marking-layer color are complementary colors.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific example configurations have been described for purposes of illustration, it will be understood that various modifications may be made without departing from the spirit and scope of the disclosure.

I claim:

1. A handheld gaming controller comprising:
   a handle; and
   a user input device on the handle, wherein the user input device comprises:
      first indicia in a first marking layer indicating a first function of the user input device for a first game; and
      second indicia in a second marking layer indicating a second function of the user input device for a second game, wherein the second game is different from the first game;
   a first light source;
   a first channel configured to convey light emitted by the first light source to the first marking layer to illuminate the first indicia;
   a second light source; and
   a second channel configured to convey light emitted by the second light source to the second marking layer to illuminate the second indicia;
   wherein:
      the first light source is configured to be selectively activated in response to the handheld gaming device being configured for the first game; and
      the second light source is configured to be selectively activated in response to the handheld gaming device being configured for the second game.

2. The handheld gaming controller of claim 1, wherein the user input device comprises a button, an analog stick, a touchscreen, a touch pad, a knob, a slider, a switch, a wheel, a dial, or a directional pad.

3. The handheld gaming controller of claim 1, wherein the user input device further comprises a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

4. The handheld gaming controller of claim 1, wherein the user input device further comprises a substantially opaque base layer, the second marking layer being between the base layer and the first marking layer.

5. The handheld gaming controller of claim 1, wherein:
   the first light source is configured to illuminate the first indicia in the first marking layer in an "on" status of the first light source and to not illuminate the first indicia in the first marking layer in an "off" status of the first light source;
   the second light source is configured to illuminate the second indicia in the second marking layer in an "on" status of the second light source and to not illuminate the second indicia in the second marking layer in an "off" status of the second light source;
   the first light source is configured to be in the "off" status of the first light source when the second light source is in the "on" status of the second light source; and
   the second light source is configured to be in the "off" status of the second light source when the first light source is in the "on" status of the first light source.

6. The handheld gaming controller of claim 1, wherein the first light source emits light that is colored, and wherein the first marking layer is tinted in a first-marking-layer color that is substantially the same color as the light emitted from the first light source.

7. The handheld gaming controller of claim 1, wherein the first marking layer includes texturing configured to scatter light emitted by the first light source.

8. A handheld gaming controller comprising:
   a handle; and
   a user input device on the handle, wherein the user input device comprises:
      first indicia in a first marking layer indicating a first function of the user input device for a first mode of gameplay; and
      second indicia in a second marking layer indicating a second function of the user input device for a second mode of gameplay, wherein the second mode of gameplay is different from the first mode of gameplay;
   a first light source;
   a first channel configured to convey light emitted by the first light source to the first marking layer to illuminate the first indicia;
   a second light source; and
   a second channel configured to convey light emitted by the second light source to the second marking layer to illuminate the second indicia;
   wherein:
      the first light source is configured to be selectively activated in response to the handheld gaming device being configured for the first mode of gameplay; and
      the second light source is configured to be selectively activated in response to the handheld gaming device being configured for the second mode of gameplay.

9. The handheld gaming controller of claim 8, wherein the user input device comprises a button, an analog stick, a touchscreen, a touch pad, a knob, a slider, a switch, a wheel, a dial, or a directional pad.

10. The handheld gaming controller of claim 8, wherein the user input device further comprises a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

11. The handheld gaming controller of claim 8, wherein the user input device further comprises a substantially opaque base layer, the second marking layer being between the base layer and the first marking layer.

12. The handheld gaming controller of claim 8, wherein:
   the first light source is configured to illuminate the first indicia in the first marking layer in an "on" status of the first light source and to not illuminate the first indicia in the first marking layer in an "off" status of the first light source;
   the second light source is configured to illuminate the second indicia in the second marking layer in an "on" status of the second light source and to not illuminate the second indicia in the second marking layer in an "off" status of the second light source;
   the first light source is configured to be in the "off" status of the first light source when the second light source is in the "on" status of the second light source; and
   the second light source is configured to be in the "off" status of the second light source when the first light source is in the "on" status of the first light source.

13. The handheld gaming controller of claim 8, wherein the first light source emits light that is colored, and wherein the first marking layer is tinted in a first-marking-layer color that is substantially the same color as the light emitted from the first light source.

14. The handheld gaming controller of claim 8, wherein the first marking layer includes texturing configured to scatter light emitted by the first light source.

15. A handheld gaming controller comprising:
- a handle; and
- a user input device on the handle;
- wherein the user input device comprises:
  - first indicia in a first marking layer indicating a first function of the user input device, wherein the first indicia is configured to be illuminated by a first light source conveying light emitted through a first channel to the first indicia in response to the first light source being selectively activated in response to the handheld gaming device being configured for a first game; and
  - second indicia in a second marking layer indicating a second function of the user input device, wherein the second indicia is configured to be illuminated by a second light source conveying light emitted through a second channel to the second indicia in response to the second light source being selectively activated in response to the handheld gaming device being configured for a second game, the second game being different from the first game.

16. The handheld gaming controller of claim 15, wherein the user input device comprises a button, an analog stick, a touchscreen, a touch pad, a knob, a slider, a switch, a wheel, a dial, or a directional pad.

17. The handheld gaming controller of claim 15, wherein the user input device further comprises a top casing, the first marking layer being between the top casing and the second marking layer, the top casing configured to allow the first indicia to be visible to a user through the top casing when the first indicia is illuminated by the first light source, the top casing further configured to allow the second indicia to be visible to the user through the top casing when the second indicia is illuminated by the second light source.

18. The handheld gaming controller of claim 15, wherein the user input device further comprises a substantially opaque base layer, the second marking layer being between the base layer and the first marking layer.

19. The handheld gaming controller of claim 15, wherein the first light source emits light that is colored, and wherein the first marking layer is tinted in a first-marking-layer color that is substantially the same color as the light emitted from the first light source.

20. The handheld gaming controller of claim 15, wherein the first marking layer includes texturing configured to scatter light emitted by the first light source.

* * * * *